3,097,082
GASIFICATION OF HYDROCARBON FUEL OILS
Frank E. Guptill, Jr., Whittier, Calif., assignor to Texaco Inc., New York, N.Y., a corporation of Delaware
No Drawing. Filed Feb. 23, 1960, Ser. No. 10,110
2 Claims. (Cl. 48—215)

This invention relates to the conversion of liquid hydrocarbon to gaseous products comprising carbon monoxide and hydrogen. This process makes possible complete utilization of the carbon content of liquid hydrocarbons, even of heavy hydrocarbon liquids containing naturally-occurring heavy metal compounds, for the production of carbon monoxide and hydrogen by direct partial oxidation.

In one of its more specific aspects, the invention is directed to a process wherein heavy hydrocarbon liquid is subjected to partial oxidation with free oxygen and steam, together with added amounts of solid carbon, to produce carbon monoxide and hydrogen and entrained free carbon, and said entrained carbon is transferred to water and then to oil and returned to said partial oxidation step. In another specific embodiment, free carbon is removed from the product gas of the partial oxidation reaction by forming a slurry of carbon in water, the slurry is passed under turbulent flow conditions through a tubular heater wherein the water is vaporized to form steam for the reaction and the solid carbon is dispersed in the resulting steam, and the steam-carbon dispersion is then contacted with liquid hydrocarbon under highly turbulent flow conditions forming a dispersion of oil droplets in steam, which dispersion of said oil droplets containing said carbon is supplied to the reaction zone as fuel for the partial combustion reaction.

In the partial oxidation of hydrocarbon liquids, for example fuel oil, crude oil, heavy crude residua and the like, the hydrocarbon is reacted with air, oxygen-enriched air, or substantially pure oxygen, and steam in relative proportions to produce carbon monoxide and hydrogen as the major reaction products. Reaction is effected in a closed, compact reaction zone at an autogenously maintained temperature within the range of about 1800 to 3500° F., preferably within the range of about 2200 to 2800° F. The reaction zone is preferably completely free from packing and catalyst and has nearly minimum internal surface. Although the reaction may be carried out at atmospheric pressures or elevated pressure, pressures within the range of about 100 to 600 pounds per square inch gauge are generally preferred.

A preferred method of supplying liquid hydrocarbons to a gas generation zone is disclosed in U.S. Patent 2,809,-104 to Dale M. Strasser, Frank E. Guptill and Charles P. Marion, wherein liquid oil is injected into a stream of steam in turbulent flow moving at an average velocity in excess of 20 feet per second and passed through an elongated tubular heating zone under said turbulent flow conditions effecting intimate dispersion of the oil in steam.

In the generation of carbon monoxide and hydrogen by partial oxidation of heavy hydrocarbon liquids, small amounts of carbon in the form of carbon black are generated due to incomplete conversion of the carbon contained in the oil to carbon oxides. This unconverted carbon appears in the hot gaseous products as entrained solid particles. Carbon must be removed from the gaseous products of partial oxidation before the gas stream is subjected to further processing operations, e.g. the water gas shift reaction. Carbon formed in the gas generator is water wettable and may be removed from the product gas stream by scrubbing with water, generally at a temperature within the range of 200 to 450° F. The quantity of carbon which can be suspended in water is limited to a fairly small amount, within the range of about 0.5 to 3.0 percent by weight, due to the thickening properties of the carbon in water. When the scrubbing water contains about 1 percent carbon by weight from the partial oxidation reaction considerable thickening of the slurry or suspension begins to take place. When the amount of this carbon in water exceeds about 2 to 3 percent, depending upon the characteristics of the particular carbon produced, the mixture becomes so thick that it cannot be handled in ordinary pumping equipment.

In accordance with the process of this invention, the slurry obtained from the scrubbing of the carbon monoxide and hydrogen mixture with water is passed through a heating coil under turbulent flow conditions, i.e. at a velocity above about one foot per second wherein it is vaporized forming a dispersion of carbon particles in steam. Liquid oil is introduced into the resulting stream of steam and carbon particles suspended therein while said stream is moving at a velocity in excess of 20 feet per second. The resulting mixture of oil, steam and carbon is passed through an elongated tubular contacting zone at a velocity above 20 feet per second wherein said carbon particles suspended in the steam are transferred to the oil forming a dispersion of minute droplets of oil containing carbon. The resulting dispersion is fed to the reaction zone into admixture with free oxygen for the production of said carbon monoxide-hydrogen mixture. Preferably, the tubular contacting zone comprises a tubular heater wherein intimate contact is effected between said dispersed carbon particles and said oil, the oil is dispersed in a very fine droplet form in steam, and, at the same time, the carbon-oil-steam mixture is preheated. The high degree of turbulence in the tubular contacting zone disperses the oil uniformly in the steam and assures contact between the oil droplets and the carbon particles effecting transfer of the carbon to the oil. The oil is generally substantially unvaporized or, at most only partly vaporized. It is usually desirable to limit the amount of preheat of the oil-carbon-steam mixture to not above about 750° F. to prevent cracking of the oil. If desired, higher preheat temperatures may be employed, resulting in some decomposition of the oil.

Preferably, the tubular section in which the carbon-steam dispersion is contacted with the hydrocarbon liquid has a length at least one hundred times the inside diameter of the tube. Advantageously, the contacting tube has a length at least five hundred times its inside diameter. The diameter of the tubular conduit generally will be within the range of 0.3 to 1 inch.

The relative proportions of steam and oil may vary over a wide range, for example from about 0.2 to about 2 pounds of steam per pound of oil supplied to the reaction zone. In general, it is desirable to use from about 0.4 to about 1 pound of steam per pound of oil.

It has been proposed heretofore to return carbon separated from a carbon monoxide-hydrogen gas mixture resulting from partial combustion of hydrocarbons to the reaction zone to effect complete consumption of said carbon. In this way, complete conversion of carbon contained in the fuel can be effected, eliminating what might otherwise be a disposal problem. Such proposals are subject to various disadvantages, such as the necessity for handling dry carbon or for transferring the carbon from the scrubbing water to oil prior to feeding the oil to the reaction zone. In the present process, the carbon is recycled without separation from the scrubbing water but enters the reaction chamber associated with the oil. When the oil feed to the gas generator is injected into rapidly moving stream of steam containing carbon black particles dispersed therein the oil is broken up into minute droplets and at the same time carbon particles contained in the steam are transferred to the oil droplets as a component of the fuel supplied to the reaction zone. When the highly dispersed composite of carbon and hydrocarbon oil in steam is introduced into the reaction chamber and mixed with oxygen, a highly reactive intimate mixture of reactants is obtained.

While it is possible to conduct the gasification reaction so that complete conversion of the carbon in the fuel oil to carbon oxides is obtained, it has been found desirable to carry out the reaction with less than complete conversion of the hydrocarbon and to produce free carbon in an amount within the range of 0.5 to 2 percent of the carbon contained in the hydrocarbonaceous feed material. At about 1 percent unconverted carbon, maximum quantities of carbon monoxide and hydrogen are produced from a given amount of hydrocarbon. If the carbon conversion is such that substantially less than 0.5 percent of the carbon or substantially more than 2 percent of the carbon contained in the hydrocarbon feed is liberated as free carbon, substantially less than maximum conversion to carbon monoxide and hydrogen is obtained. By the process of this invention it is possible to obtain both maximum conversion of the hydrocarbon to carbon monoxide and hydrogen, and, at the same time, complete consumption of the carbon content of the hydrocarbon.

The following specific example illustrates the process of this invention.

Los Angeles Bunker C fuel oil of 8.6 API gravity, a Saybolt Furol viscosity 152 at 122° F., and a gross heating value of 18,170 B.t.u. per pound is used as fuel. This oil has the following approximate analysis:

*Ultimate Analysis of Oil*

| Component: | Weight percent |
| --- | --- |
| Carbon | 86.98 |
| Hydrogen | 9.99 |
| Nitrogen | 0.86 |
| Sulfur | 1.33 |
| Oxygen | 0.84 |

Quench water, obtained as described later, containing approximately 1 percent carbon black by weight is pumped at the rate of 222.8 pounds per hour to a tubular heater in which the water is vaporized to steam, forming a dispersion of carbon in steam and preheated to 900° F. The oil, at the rate of 307.5 pounds per hour, is injected without preheat into the steam containing the carbon black, passed through a tubular heater in turbulent flow wherein the mixture is heated to 720° F. The oil-carbon dispersion in steam enters the generator at 720° F. where it is mixed with oxygen at the rate of 3,830 standard cubic feet per hour of pure oxygen. The generator operates at 2550° F. and 342 p.s.i.g. The resulting product gas containing approximately 2.1 pounds of carbon per hour is produced at the rate of about 16,250 standard cubic feet per hour, on a dry (water-free basis). The product gas has the following approximate analysis on a dry basis:

*Product Gas Analysis*

| Component: | Volume percent |
| --- | --- |
| Hydrogen | 46.5 |
| Carbon monoxide | 45.4 |
| Carbon dioxide | 7.7 |
| Nitrogen | 0.1 |
| Methane | 0.1 |
| Hydrogen sulfide and carbonyl sulfide | 0.2 |

The product gas from the generator is contacted directly with water in a quench vessel. Nearly all the carbon is transferred to the quench water forming a slurry of carbon in water. This slurry is withdrawn from the quench vessel at the rate required to supply the process water feed to the generator. In this case, the slurry contains approximately 1 percent carbon by weight. Substantially all the carbon is recycled and converted to product gas.

Obviously many modifications and variations of the invention as hereinabove set forth may be made without departing from the spirit and scope thereof and therefore only such limitations should be imposed as are indicated in the appended claims.

I claim:

1. In a process for the generation of gaseous mixtures of carbon monoxide and hydrogen wherein a liquid hydrocarbon is subjected to partial oxidation by reaction with oxygen and steam in a gas generation zone at an autogenous temperature within the range of about 1800 to 3500° F. producing a hot product gas stream comprising carbon monoxide, hydrogen and unconverted free carbon from said liquid hydrocarbon and wherein said product gas is contacted with water in a contacting zone effecting removal of said carbon from the gas stream and forming a slurry consisting essentially of carbon in water, the improvement which comprises withdrawing from said contacting zone a pumpable slurry of said carbon in water containing from 0.5 to 3 percent carbon by weight; passing said carbon-water slurry in turbulent flow into an elongated tubular heating zone wherein said water is vaporized thereby forming a stream of steam containing said carbon dispersed and entrained therein and having a velocity in excess of 20 feet per second; injecting heavy liquid hydrocarbon into said stream of steam containing said dispersed carbon thereby forming a stream of steam containing suspended carbon and entrained liquid hydrocarbon; passing the mixed stream at a velocity in excess of 20 feet per second through a second elongated tubular heating zone providing a flow path having a length at least 100 times its diameter whereby said hydrocarbon oil is uniformly dispersed and suspended in fine droplet form in said stream of steam and suspended carbon is simultaneously transferred to said oil droplets; and passing the resulting dispersion of carbon-containing oil droplets suspended in steam into said reaction zone in admixture with said oxygen-containing gas.

2. In a process for the generation of gaseous mixtures of carbon monoxide and hydrogen wherein a liquid hydrocarbon is subjected to partial oxidation by reaction with oxygen and steam in a gas generation zone at an autogenous temperature within the range of about 1800 to 3500° F., the relative proportions of liquid hydrocarbon, oxygen and steam are maintained to effect release of 0.5 to 2 percent of the carbon contained in the hydrocarbon as free carbon producing a hot product gas stream comprising carbon monoxide, hydrogen and unconverted free carbon from said liquid hydrocarbon and wherein said product gas is contacted with water in a contacting zone effecting removal of said carbon from the gas stream and forming a slurry consisting essentially of carbon in water, the improvement which comprises withdrawing from said contacting zone a pumpable slurry of said carbon in water containing from 0.5 to 3 percent carbon by weight; passing said carbon-water slurry in turbulent flow into an elongated tubular heating zone wherein said water is vaporized thereby forming a stream of steam containing said carbon dispersed and entrained therein and having a velocity in excess of 20 feet per second; injecting heavy liquid hydrocarbon into said stream of steam containing said dispersed carbon thereby forming a stream of steam containing suspended carbon and entrained liquid hydrocarbon; and containing from about 0.4 to about 1 pound of steam per pound of oil; passing the mixed stream at a velocity in excess of 20 feet per second through a second elongated tubular heating zone providing a flow path having a length at least 100 times its diameter whereby said hydrocarbon oil is uniformly dispersed and suspended in fine droplet form in said stream of steam and suspended carbon is simultaneously transferred to said oil droplets; and passing the resulting dispersion of carbon-containing oil droplets suspended in steam into said reaction zone in admixture with said oxygen-containing gas.

References Cited in the file of this patent

UNITED STATES PATENTS

| | | |
|---|---|---|
| 2,698,830 | Jenny | Jan. 4, 1955 |
| 2,781,246 | Goldtrap | Feb. 12, 1957 |
| 2,809,104 | Strasser et al. | Oct. 8, 1957 |
| 2,867,508 | Wood et al. | Jan. 6, 1959 |
| 2,908,634 | Stratford | Oct. 13, 1959 |
| 3,010,813 | Clarke et al. | Nov. 28, 1961 |
| 3,025,149 | Eastman | Mar. 13, 1962 |

FOREIGN PATENTS

| | | |
|---|---|---|
| 168,581 | Great Britain | Apr. 13, 1921 |